(12) United States Patent
Kim et al.

(10) Patent No.: US 10,942,648 B2
(45) Date of Patent: *Mar. 9, 2021

(54) MOBILE COMMUNICATION TERMINAL AND INFORMATION DISPLAY METHOD THEREOF

(71) Applicant: Rovi Guides, Inc., San Jose, CA (US)

(72) Inventors: Hyun Ho Kim, Seoul (KR); Yung Hee Kim, Anyang-si (KR)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/780,644

(22) Filed: Feb. 3, 2020

(65) Prior Publication Data

US 2020/0249836 A1 Aug. 6, 2020

Related U.S. Application Data

(63) Continuation of application No. 14/493,714, filed on Sep. 23, 2014, now Pat. No. 10,552,036, which is a continuation of application No. 12/898,598, filed on Oct. 5, 2010, now Pat. No. 8,934,943, which is a continuation of application No. 11/723,709, filed on Mar. 21, 2007, now Pat. No. 7,822,443.

(30) Foreign Application Priority Data

Mar. 21, 2006 (KR) .................. 10-2006-0025759

(51) Int. Cl.
*G06F 3/0488* (2013.01)
*G06F 3/0485* (2013.01)
*G06F 3/0482* (2013.01)
*H04M 1/725* (2006.01)

(52) U.S. Cl.
CPC ........ *G06F 3/04886* (2013.01); *G06F 3/0482* (2013.01); *G06F 3/0485* (2013.01); *G06F 3/0488* (2013.01); *G06F 3/04883* (2013.01); *H04M 1/72519* (2013.01); *Y10S 379/916* (2013.01)

(58) Field of Classification Search
CPC .... G06F 3/0485; G06F 3/0488; G06F 3/0482; G06F 3/04883; G06F 3/04886; H04M 1/72519; H04M 1/72583
USPC .......................... 345/173, 157, 684; 455/566
See application file for complete search history.

(56) References Cited

U.S. PATENT DOCUMENTS

| | | | | |
|---|---|---|---|---|
| 2002/0191029 A1* | 12/2002 | Gillespie | ............. | G06F 3/04817 715/810 |
| 2005/0024341 A1* | 2/2005 | Gillespie | ............... | G06F 3/0481 345/173 |
| 2005/0091596 A1* | 4/2005 | Anthony | ............... | G06F 3/0482 715/712 |
| 2005/0108234 A1* | 5/2005 | Oksanen | ............... | G06F 3/0485 |
| 2005/0257166 A1* | 11/2005 | Tu | ......................... | G06F 3/0485 715/787 |
| 2006/0026535 A1* | 2/2006 | Hotelling | ............ | G06F 3/04883 715/863 |

(Continued)

*Primary Examiner* — Margaret G Mastrodonato
(74) *Attorney, Agent, or Firm* — Haley Guiliano LLP

(57) ABSTRACT

An information display method in a mobile communication terminal. The method includes displaying information on a display unit of the mobile terminal, generating a scrolling start signal, and scrolling the information with a positive acceleration based on the generated scrolling start signal.

19 Claims, 4 Drawing Sheets

(56) References Cited

U.S. PATENT DOCUMENTS

2006/0038796 A1\* 2/2006 Hinckley ............ G06F 3/04855
345/173

\* cited by examiner

MOBILE COMMUNICATION TERMINAL AND INFORMATION DISPLAY METHOD THEREOF

This application is a continuation of U.S. patent application Ser. No. 14/493,714, filed Sep. 23, 2014, which is a continuation of U.S. patent application Ser. No. 12/898,598 (now U.S. Pat. No. 8,934,943), filed Oct. 5, 2010, which is a continuation of U.S. patent application Ser. No. 11/723,709 (now U.S. Pat. No. 7,822,443), filed en-Mar. 21, 2007, which claims priority to Korean Patent Application No. 10-2006-0025759, filed Mar. 21, 2006, each of which is hereby incorporated by reference herein in its entirety, respectively.

BACKGROUND OF THE INVENTION

Field of the Invention

The present invention relates to a mobile communication terminal and corresponding method for scrolling through information displayed on the terminal.

Description of the Related Art

Mobile communication terminals now provide many additional services beside the basic call service. For example, a user can display pictures, scheduling information, a list of contacts (e.g., a phone book), etc. on the terminal. However, because mobile terminals are compact in size, the amount of information that can be displayed on the terminal is limited. This inconveniences the user of the terminal.

SUMMARY OF THE INVENTION

Accordingly, one object of the present invention is to address the above-noted and other problems of the related art.

Another object of the present invention is to provide a mobile communication terminal and corresponding method that allows the user to rapidly scroll through information displayed on the terminal.

To achieve these and other advantages and in accordance with the purpose of the present invention, as embodied and broadly described herein, the present invention provides in one aspect an information display method in a mobile communication terminal. The method includes displaying information on a display unit of the mobile terminal, generating a scrolling start signal, and scrolling the information with a positive acceleration based on the generated scrolling start signal. The present invention also provides a corresponding mobile communication terminal.

In another aspect, the present invention provides an information display method in a mobile communication terminal. The method includes scrolling information on a display unit of the mobile terminal, and terminating the scrolling step with a negative acceleration. The method also provides a corresponding mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE PRESENT INVENTION

Reference will now be made in detail to the preferred embodiments of the present invention, examples of which are illustrated in the accompanying drawings.

Figure 1:
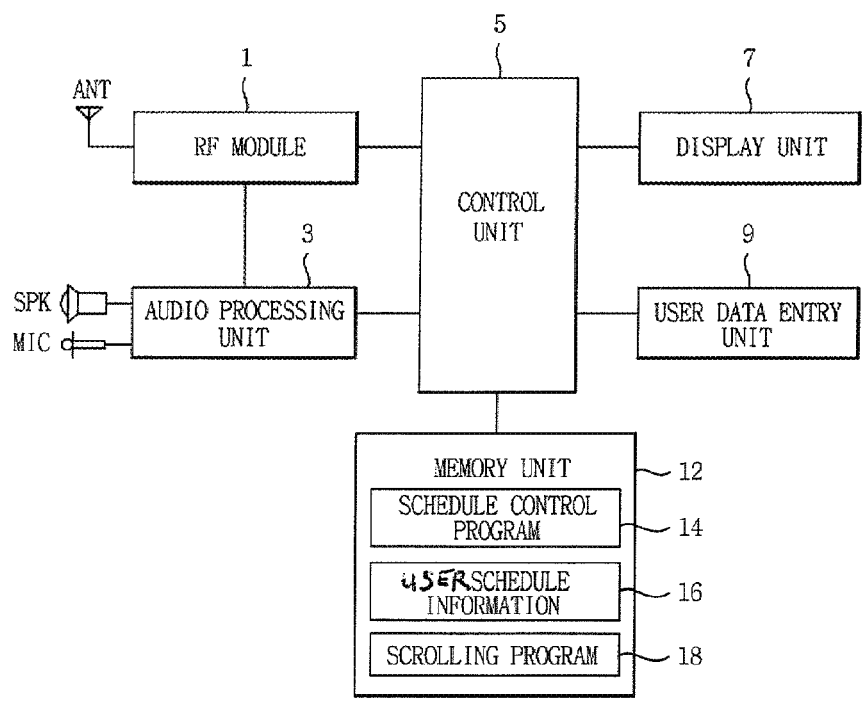
FIG. 1 is a block diagram of a mobile communication terminal according to an embodiment of the present invention.

Turning first to FIG. 1, which is a block diagram of a mobile communication terminal according to an embodiment of the present invention. As shown, the mobile terminal includes an RF (Radio Frequency) module 1 for transmitting and receiving radio signals, an audio processing unit 3 for processing audio signals input and output through a microphone MIC and speaker SPK, a user input unit 9 allowing a user to request a scrolling operation, a display unit 7 for displaying information, a memory unit 12 for storing user information and programs for controlling the terminal, and a control unit 5 for controlling an overall operation of the terminal including the scrolling operation of the present invention.

In addition, the control unit 5 displays information such as pictures, scheduling information, contact information, etc. on the display unit 4 based on instructions entered into the input unit 9. The control unit 5 also controls a scrolling speed of information scrolled through on the display unit 9 via instructions entered on the input unit 9.

Further, the input unit 9 includes various input devices for inputting numbers and text information and for controlling different operations of the terminal. For example, the input unit 9 includes keypads, direction keys, side keys, etc., as well a sensor device allowing the user to input information on the terminal. For example, the input unit 9 may include a touch screen on the display unit 7 allowing the user to input information by touching the touch screen. The sensor device may also include a touching sensor, distance sensor, a terrestrial magnetism sensor, etc.

Further, the direction keys, the side keys, the sensor device, etc. may be set as the device the user uses to scroll through information on the display unit 7. The scrolling operation of the present invention will be discussed in more detail later. The scrolling key may also be set as a plurality of keys for scrolling start/stop/acceleration/retardation, etc. or only one key may be set.

In addition, the set scrolling key(s) may be used to perform several different functions. For example, the scrolling speed may be increased by the user pressing a pressure sensor key set as the scrolling key for a longer period of time or with more pressure. The scrolling speed may also be increased by selecting a particular touch sensor key in a rapid manner (e.g., double or triple clicking a particular key).

In addition, as shown in FIG. 1, the memory unit 12 stores user schedule information 16 such as photos, phone book data, and stores schedule control program(s) 14. The memory unit 12 also stores a scrolling program 18 for performing a scrolling operation according to an embodiment of the present invention. Further, the user schedule information 16 includes schedule information such as appointments, business plans, etc. input by a user, and related information such as the date, time, place, etc. of the corresponding schedule.

In addition, the schedule control program 14 supplies the input and output interfaces for the user schedule information 16, and controls user schedule information entered by the user. For instance, an input window for inputting schedule information and a display window to display the entered information are provided. In addition, the schedule control function performs a reminder function, etc. on a corresponding date and time of input user schedule information 16.

In addition, a FLASH program may be used with the scrolling program 18. In more detail, the FLASH program is copyrighted software developed by Macromedia, and is used for making animation pictures based on vectors accompanying simple interaction. The FLASH program is also useful for controlling the input and output of pictures displayed on the terminal. For example, pictures can be displayed in a rapid manner so as to create a smooth presentation of the displayed pictures. Therefore, the scrolling program 18 can be created to display graphic data at variable speeds to coincide with a scrolling speed set by the present invention.

Further, the control unit 5 controls the different functions of the mobile terminal such as the phone book function, the schedule function, the memo function, the album function, etc. based on controlling data stored in the memory unit 12. The control unit 5 also displays text and images on the display unit 7. In addition, the control unit 5 controls an image or other information displayed on the display unit 7 to be scrolled in upper, lower, left and right direction in accordance with information input by the user through the input unit 9. The control unit 5 also starts the scrolling operation and increases the scrolling speed slowly when a scrolling start signal is first input, and then controls the scrolling operation to be stopped at a desired final part while slowly decreasing the scrolling speed when a scrolling stop signal is input.

Further, when the corresponding scrolling signals are input and the scrolling acceleration/retardation function is turned on, the control unit 5 controls the scrolling speed variously. For example, the control unit 5 increases the scrolling speed when a user increases the pressure on an input pressure sensor or when the user continuously touches a touch sensor. The scrolling program 18 controls the scrolling speed in accordance with information input by the user.

Figure 2:
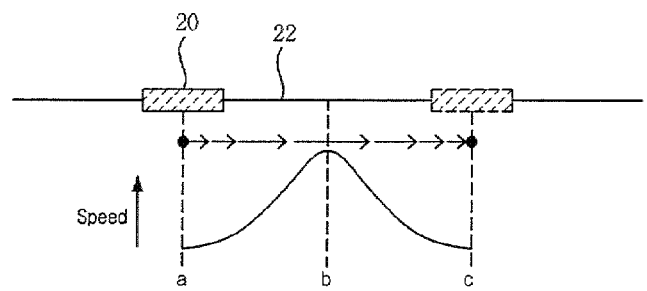
FIG. 2 is a scrolling operation state diagram illustrating a scrolling operation according to an embodiment of the present invention.

Turning next to FIG. 2, which is a scrolling operation state diagram illustrating how a scrolling speed is changed according to an embodiment of the present invention. As shown in FIG. 2, a scroll line 22 and a scroll bar 20 are displayed on the display unit 7 when data to be displayed on the screen is larger than the size of the screen. Further, the scroll line 22 indicates an overall length and breadth of the graphic data, and the location of the scroll bar 20 indicates a location of the currently displayed graphic data against the length of the entire graphic data. In addition, a user can determine that the end of the data is displayed when the scroll bar 22 reaches the end of the scroll line 22. The user can also determine the middle portion of the data is being displayed when the scroll bar 22 is at the middle of the scroll line 22.

In addition, when the user selects the scrolling function through the user input unit 9, a scrolling start signal is sent to the control unit 5, and thus the control unit 5 starts to scroll the information displayed on the display unit 7 at the starting point "a." Further, as shown in FIG. 2, the control unit 5 slowly increases the scrolling speed or acceleration until the position "b" and then slowly decreases the scrolling speed or acceleration until the scrolling operation is stopped at point "c." The user can also check the scrolling condition as the scroll bar 20 moves on the scroll line 22 with the same speed as the scrolling speed of the information displayed on the display unit 7. Further, the information displayed on the display unit 7 is displayed naturally.

In addition, the user can skip through portions of the information because the scrolling speed or acceleration is initially increased and then decreased as shown in FIG. 2. That is, the scrolling speed is not constant. Therefore, the user can easily search photo data, phone book data, schedule data, etc.

Figure 3:
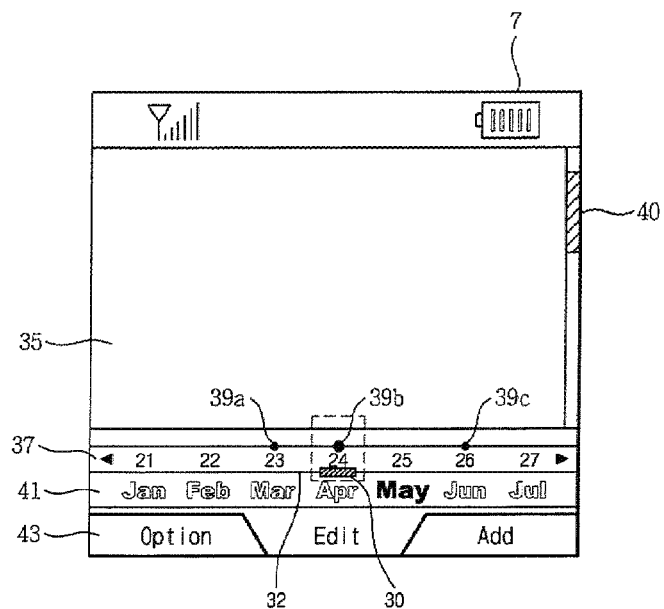
FIG. 3 is a schedule display state diagram illustrating another scrolling operation according to an embodiment of the present invention.

Next, FIG. 3 is a display state diagram of a schedule control display window according to an embodiment of the present invention. In this example, the schedule control display window displays the user schedule information 16 on the display unit 7. Further, the user can scroll through the displayed information using the scroll bar 30 displayed on a time scroll line 32. In more detail, the schedule control display window supplied by the schedule control program 14 includes a schedule view window 35 for displaying information, a first time line 37 and a second time line 41, the time scroll bar 30 and the time scroll line 32 displaying the date of the currently displayed schedule and displaying the scrolling condition of the schedule view window 35, and menus 43.

Further, the user can input and edit the schedule information using the add and edit functions included in the menus 43. The user can also set an environment such as setting the color of the schedule view window 35, the displaying condition, etc. using the option function. In addition, the schedule information such as events, appointments, location, etc. input by the user are displayed on the schedule view window 35. Photos or other graphics may also be displayed at the same time.

In addition, schedule information per day is displayed on the schedule view window 35. Further, the breadth size of the user schedule information is generally larger than a size of the display. Thus, the user can check the information not displayed on the schedule view window 35 using the scroll bar 40 supplied on the schedule view window 35. Thus, in this example, there are two scroll bars: the scroll bar 30 for scrolling through different days in the schedule, and the scroll bar 40 used for scrolling through information displayed per day on the display window 35.

Further, the first time line 37 displays the different days in a month, the second time line 41 displays the months, and the time scroll bar 30 can be used to scroll through the different days of the month. As shown in FIG. 3, the scroll bar 30 is positioned between the first time line 37 and the second time line 41. That is, the time scroll line 32 and the time scroll bar 30 are displayed under the first time line 37 displaying the different days of the month. Thus, the user can scroll through the different days of the month using the scroll bar 30.

In more detail, the user can move the scroll bar 30 in a left or right direction on the scroll line 32 to respectively show dates earlier or later in the corresponding month. For example, the first time line 37 in FIG. 3 displays the date from the 21st to the 27$^{th}$. Thus, the user can display dates after 27th by moving the scroll bar 30 in the right direction, and display the dates before the 21st by moving the scroll bar 30 in the left direction.

In addition, it also possible to display the dates having input schedule information using schedule directors 30$a$, 30$b$ and 30$c$. For example, the first time line 37 in FIG. 3 includes the schedule directors 30$a$, 30$b$ and 30$c$ on each of the dates 23rd, 24th and 26th. Further, the current day of the present month is first displayed at a center position as a standard when the schedule controlling function is first started. Also, the second time line 41 displays the months, and the current month or selected month is highlighted. For example, in FIG. 3, the selected or current month is MAY. Further, when the scroll bar 30 is moved into a new month, the new month is then highlighted.

Figure 4:
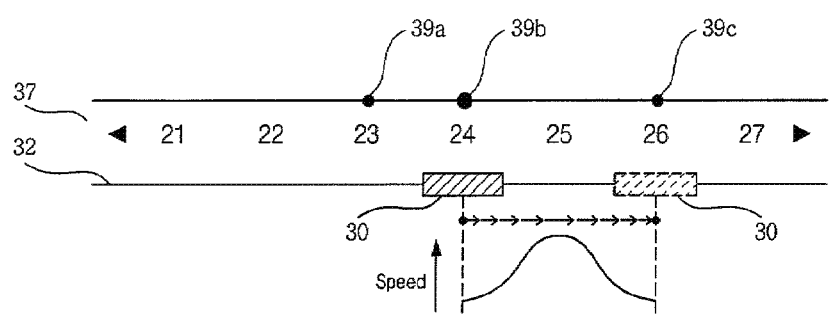
FIG. 4 is a graph illustrating a scrolling speed of a scrolling device according to an embodiment of the present invention.

Turning now to FIG. 4, which is a graph illustrating a scrolling speed of the schedule view window 35 shown in FIG. 3. As discussed previously, the user can select the scrolling function using the input unit 9. For example, the user can select a direction key or side key as the scrolling key, or select a left/right key or up/down key as the scrolling key. Further, when the display is a touch screen, the user can simply touch and drag the time scroll bar 30.

As shown in FIG. 4, the user moves the time scroll bar 30 in a right direction from the 24$^{th}$ day to the 26$^{th}$ day. As shown in the lower portion of FIG. 4, the scrolling speed is initially increased and then decreased. This is similar to FIG. 2. Thus, in this example, the schedule information displayed on the terminal moves from the 24$^{th}$ date to the 26$^{th}$ date with the scrolling speed being increased slowly and then decreased slowly and finally stopped.

Further, as illustrated in FIG. 4, the schedule directors 39$a$, 39$b$ and 39$c$ are displayed. Thus, the scrolling operation stops at the day of 26$^{th}$ on which the schedule director 39$c$ is indicated. Further, the scroll bar 30 stops as the speed is slowly decreased at the location of the 26$^{th}$ day. Further, when a user selects the scrolling speed be accelerated, the time scroll bar 30 is scrolled faster than before.

Figure 5:
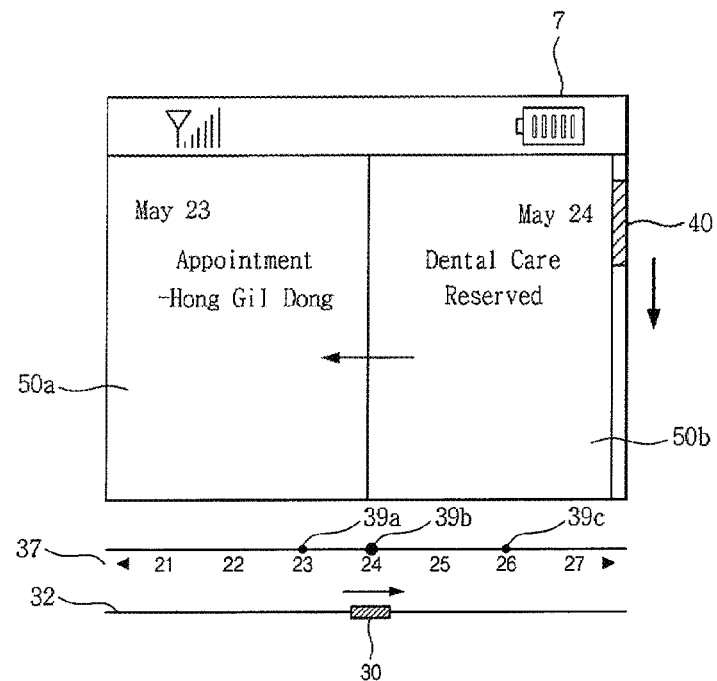
FIG. 5 is a display state diagram illustrating a calendar being scrolled through on a terminal according to an embodiment of the present invention.
Figure 6:
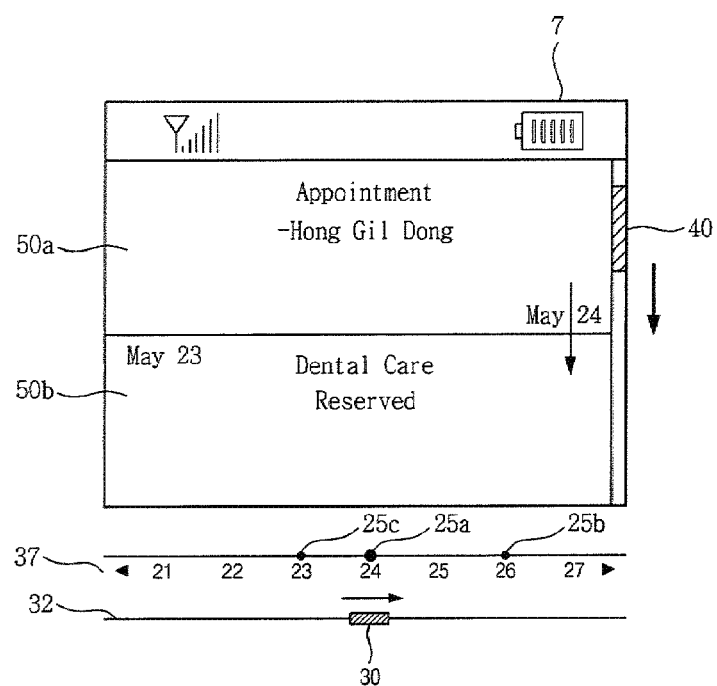
FIG. 6 is a display state diagrams illustrating a calendar being scrolled through on a terminal according to another embodiment of the present invention.

Next, FIGS. 5 and 6 are display state diagrams illustrating a scrolling operation for appointments according to another embodiment of the present invention. In this example, FIG. 5 illustrates the schedule information being scrolled in left and right directions, and FIG. 6 illustrates the schedule information being scrolled in upper and lower directions.

As shown in FIG. 5, the schedule information is displayed in a book format and the user can scroll through pages of the schedule by moving the scroll bar 30 on the scroll line 32. As discussed above, the user can use a key on the terminal to move the scroll bar 30 or simply drag the scroll bar 30 when the display is a touch screen. The control unit 5 also variably adjusts the scroll speed as discussed above.

Further, as shown in FIG. 5, the displayed window also includes the schedule directors 39$a$, 39$b$ and 39 indicating the 23rd, the 24$^{th}$ and the 26$^{th}$ day of the month. Further, the currently displayed dates include the pages 50$a$ and 50$b$ corresponding to May 23 and May 24, respectively. Thus, when the user moves the scroll bar 30 in the right direction (as shown by the arrow), the pages in the schedule book are scrolled through in the left direction (with an initial increased scroll acceleration and then a decreased scroll acceleration).

FIG. 6 is similar to FIG. 5, but the pages 50$a$ and 50$b$ are displayed one above the other. In this example, the pages of the schedule book are scrolled in an up and down fashion. The schedule directors 25$a$, 25$b$ and 25$c$ are also displayed in FIG. 6. The scroll speed is also adjusted variably as discussed above.

Figure 7:
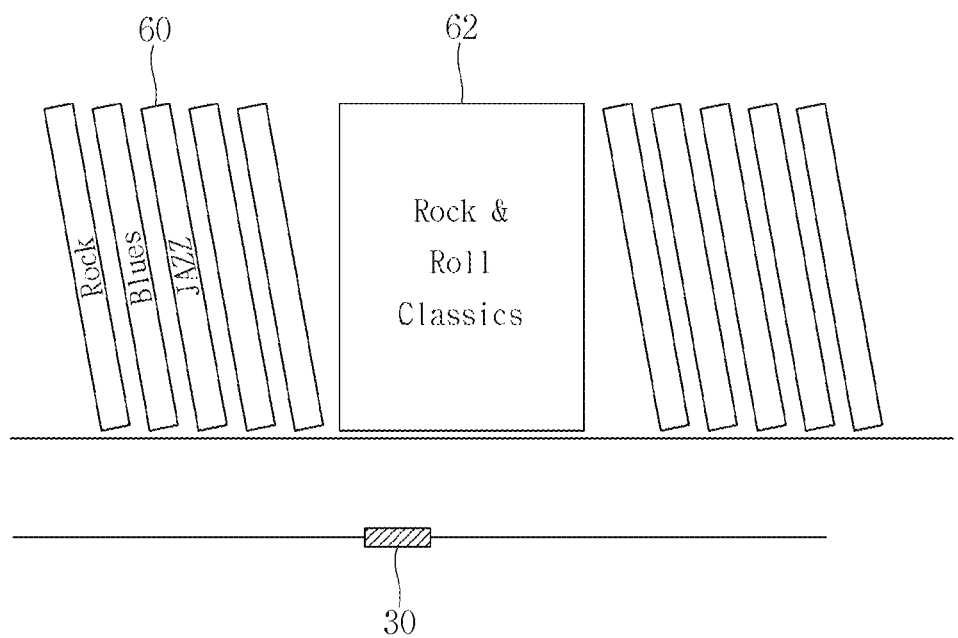
FIG. 7 is an overview illustrating music albums being scrolled through on a terminal according to an embodiment of the present invention.

Further, FIG. 7 illustrates an example of a user scrolling through CDs or album covers according to an embodiment of the present invention. In more detail, the user can download their favorite music onto their mobile terminal. The music (e.g., MP3 files) may be organized into albums, types of music, etc. In the example of FIG. 6, the music is arranged into groups of albums 60. Further, the user can scroll through the arrangement of albums using the scroll bar 30. The scroll speed and other elements can be operated in a similar manner as discussed above with respect to the other embodiments. Thus, the user can easily scroll through their music files.

In addition, as shown in FIG. 7, an album corresponding to where the scrolling album has stopped is displayed horizontally so the user can easily see the album cover. Further, information may be written on edges of the music album so the user can also view the title and other information related to the particular CD or music selection. The albums may also be separated from each other by a sufficient distance such that the user can see a portion of the front cover of the album as well as the edge portion. The CDs or albums are also displayed at an angle so a user can see a portion of the front cover of the CD or album.

In addition, the above-description describes the user using the scroll bar to scroll through information. However, the user can also use his or her finger to "flip" or scroll through pages of information rather than using the scroll bar. That is, when the display is a touch screen, the user can simply "flick" the display screen to scroll or flip through pages of the information. For example, and with reference to FIG. 7, the user can simply place his or her finger over the CDs and drag or flick their finger in a direction he or she wants to scroll.

In addition, the control unit 5 determines a distance of a stroke of the user's finger and scrolls a predetermined amount based on the determined distance. For example, if the user strokes or drags his or her finger across the screen a short distance, the control unit 5 would scroll a less amount of albums than if the user strokes or drags his or her finger all the way across the screen. In addition, the memory unit 12 can store a table including values related to a stroke distance and an amount of information (e.g., pages) to scroll through. For example, if the user strokes his or her finger 10 cm across the touch screen, the control unit can flip through 20 pages, if the user strokes his or her finger across the screen 5 cm, the control unit can flip through 5 pages, etc. The amount of information to scroll through can also be set and changed by the user using menu options provided with the terminal.

For example, the user can create a table including stroke distances and a corresponding number of pages to flip through using menus provided with the terminal. Thus, the amount of information to be scrolled through can be variably set by the user, which is particularly advantageous because each user may have different scrolling preferences. In addition, the control unit can also determine an amount of information to scroll through based on how much pressure the user uses to perform a scrolling operation.

In addition, the user can also press a particular button on the terminal (or a portion of a touch screen) to rapidly scroll information. That is, the control unit rapidly scrolls through information as long as the user is pressing or touching the particular button, and then when the user release the particular button, the control unit begins to slow down the scrolling operation. Thus, the user controls when the scrolling operation is to begin slowing down. This differs from the above examples in which the user moves the scroll bar to a particular location and the control unit automatically increases and decreases the scrolling speed to the information corresponding to where the scroll bar is finally located is displayed.

Thus, in accordance with the above-described embodiments of the present invention, when the intervals between information to be scrolled through is large, the information in the middle that the user is not particularly interested in can be scrolled through rapidly. In addition, the user can scroll through the information by moving the scroll bar or by continuously pressing a particular scrolling key.

Further, the scrolling operation in which the scrolling speed is increased and then decreased results in information being displayed in an efficient manner. That is, the information is naturally displayed as the scrolling is stopped, and is rapidly displayed when the scrolling speed is increased.

In addition, the above-described scrolling operations can be applied to all types of information used in mobile communication terminals, such as searching photos, searching phone book information stored, etc. Further, the present invention is particular advantageous over other scrolling methods because the user can quickly and efficiently scroll through information. On the contrary, other scrolling methods only scroll through information at a constant speed (i.e., one page at a time). Further, the other scrolling methods do not allow the user to adjust or set a desired scrolling speed.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits whereby interconnecting an appropriate network of conventional computer circuits, as will be readily apparent to those skilled in the art. Any portion of the present invention implemented on a general purpose digital computer or microprocessor includes a computer program product which is a storage medium including instructions which can be used to program a computer to perform a process of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile communication terminal comprising:
a table including values related to a scroll distance and information to scroll through;
a touch screen configured to:
display a plurality of items on a display area
display a first item of the plurality of items in a middle position, horizontally, relative to other items of the plurality of items on the display area, when scrolling stops,
display the first item in a front cover view,
display each of the other items of the plurality of displayed items on the left or right, relative to the first item, and at an angle relative to the front cover view of the first item, such that a portion of a front cover of the items not in the middle position are visible, and
display a title or other information related to the other items on an edge portion of the other items; and
a controller, operatively coupled to the touch screen, configured to:
control the touch screen to display, in response to a first scroll input, a second item of the plurality of items in the middle position, relative to the other items of the plurality of displayed items, and in a front cover view with the first item positioned to the left or the right, relative to the second item and displayed, along with the other items of the plurality of items, not including the second item, at an angle relative to the front cover view of the second item; and
determine a distance associated with the first scroll input and scroll the first item, a predetermined amount, based on the determined distance.

2. The mobile communication terminal of claim 1, wherein the controller is further configured to control a scrolling speed based on an amount of pressure exerted on a pressure sensor key.

3. The mobile communication terminal of claim 1, wherein the controller is further configured to control a scrolling speed based on a length of time pressure is exerted on a pressure sensor key.

4. The mobile communication terminal of claim 1, wherein the controller is further configured to determine when to stop the information from scrolling based on an initial scrolling speed.

5. The mobile communication terminal of claim 1, wherein a scrolling speed is set to one page at a time.

6. The mobile communication terminal of claim 1, wherein a scrolling speed is increased then decreased to display information.

7. The mobile communication terminal of claim 6, wherein the scrolling speed is stopped after the decrease to display information.

8. The mobile communication terminal of claim 1, wherein the plurality of items corresponds to albums.

9. The mobile communication terminal of claim 1, wherein the controller is further configured to control a scrolling speed based on a number of presses applied on a pressure sensor key.

10. A method of scrolling in a mobile communication terminal, the method comprising:

storing a table including values related to a scroll distance and an amount of information to scroll through;

displaying a plurality of items on a display area of a touch screen of the mobile communication terminal;

displaying a first item of the plurality of items in a middle position, horizontally relative to other items of the plurality of items on the display area, when scrolling stops;

displaying the first item in a front cover view;

displaying each of the other items of the plurality of displayed items on the left or right, relative to the first item, and at an angle relative to the front cover view of the first item, such that a portion of a front cover is visible;

displaying a title or other information related to the other items on an edge portion of the other items;

displaying, in response to a first scroll input, a second item of the plurality of items in the middle position, relative to the other items of the plurality of displayed items, and in a front cover view with the first item positioned to the left or the right, relative to the second item and displayed, along with the other items of the plurality of items, not including the second item, at an angle relative to the front cover view of the second item; and determining a distance associated with the first scroll input and scrolling the first item, a predetermined amount, based on the determined distance.

11. The method of claim 10, wherein a scrolling speed is based on an amount of pressure exerted on an input pressure sensor key.

12. The method of claim 10, wherein a scrolling speed is based on a length of time pressure is applied on a pressure sensor key.

13. The method of claim 10 further comprising:
determining when to stop the information from scrolling based on an initial scrolling speed.

14. The method of claim 10, wherein a scrolling speed is set to one page at a time.

15. The method of claim 10, wherein a scrolling speed is increased then decreased to display information.

16. The method of claim 15, wherein the scrolling speed is stopped after it is decrease to display information.

17. The method of claim 10, wherein the plurality of items corresponds to albums.

18. The method of claim 10, wherein the controller is further configured to control a scrolling speed based on a number of presses applied on a pressure sensor key.

19. A non-transitory computer-readable medium having instructions encoded thereon that when executed by control circuitry cause the control circuitry to:

store a table including values related to a scroll distance and an amount of information to scroll through;

display a plurality of items on a display area of a touch screen of the mobile communication terminal;

display a first item of the plurality of items in a middle position, horizontally relative to other items of the plurality of items on the display area, when scrolling stops;

display the first item in a front cover view;

display each of the other items of the plurality of displayed items on the left or right, relative to the first item, and at an angle relative to the front cover view of the first item, such that a portion of a front cover is visible;

display a title or other information related to the other items on an edge portion of the other items;

display, in response to a first scroll input, a second item of the plurality of items in the middle position, relative to the other items of the plurality of displayed items, and in a front cover view with the first item positioned to the left or the right, relative to the second item and displayed, along with the other items of the plurality of items, not including the second item, at an angle relative to the front cover view of the second item; and determine a distance associated with the first scroll input and scroll the first item, a predetermined amount, based on the determined distance.

* * * * *